US012315664B2

(12) United States Patent
Park et al.

(10) Patent No.: US 12,315,664 B2
(45) Date of Patent: May 27, 2025

(54) THREE-DIMENSIONAL WIRELESS POWER TRANSFER COIL AND APPARATUS HAVING SAME

(71) Applicant: KOREA ELECTROTECHNOLOGY RESEARCH INSTITUTE, Changwon-si (KR)

(72) Inventors: Young Jin Park, Seoul (KR); Ji Eun Kim, Ansan-si (KR); Kee Dong Yang, Anyang-si (KR); Kyung Hwan Cho, Gwacheon-si (KR)

(73) Assignee: KOREA ELECTROTECHNOLOGY RESEARCH INSTITUTE, Changwon-si (KR)

( * ) Notice: Subject to any disclaimer, the term of this patent is extended or adjusted under 35 U.S.C. 154(b) by 11 days.

(21) Appl. No.: 17/664,100

(22) Filed: May 19, 2022

(65) Prior Publication Data

US 2022/0285078 A1 Sep. 8, 2022

Related U.S. Application Data

(63) Continuation of application No. PCT/KR2020/016998, filed on Nov. 26, 2020.

(30) Foreign Application Priority Data

Nov. 26, 2019 (KR) ........................ 10-2019-0153564

(51) Int. Cl.
*H01F 27/28* (2006.01)
*H02J 50/10* (2016.01)

(52) U.S. Cl.
CPC ......... *H01F 27/28* (2013.01); *H01F 27/2804* (2013.01); *H01F 27/288* (2013.01); *H02J 50/10* (2016.02)

(58) Field of Classification Search
CPC .... H01F 27/28; H01F 27/2804; H01F 27/288; H02J 50/005; H02J 50/10; H02J 50/12
See application file for complete search history.

(56) References Cited

U.S. PATENT DOCUMENTS

2012/0274148 A1 11/2012 Sung et al.
2015/0222129 A1* 8/2015 McCauley ............ H01F 27/363
307/104

(Continued)

FOREIGN PATENT DOCUMENTS

JP 2014-87125 A 5/2014
KR 10-1179398 B1 9/2012

(Continued)

OTHER PUBLICATIONS

International Search Report for PCT/KR2020/016998 by Korean Intellectual Property Office dated Feb. 26, 2021.

*Primary Examiner* — Levi Gannon
(74) *Attorney, Agent, or Firm* — BROADVIEW IP LAW, PC

(57) ABSTRACT

The present invention relates to a WPT coil and an apparatus having same, and more particularly, to a WPT coil configured to have a three-dimensional shape by using a flexible substrate or the like, and an apparatus having same. A WPT coil is provided in a WPT device to transmit or receive wireless power, according to the present invention, the WPT coil comprising: a flexible substrate; and a coil structure provided on the flexible substrate, wherein the WPT coil forms a three-dimensional shape rather than a flat plate shape.

7 Claims, 12 Drawing Sheets

(56) References Cited

U.S. PATENT DOCUMENTS

| | | | |
|---|---|---|---|
| 2016/0036245 A1 | 2/2016 | Chang et al. | |
| 2016/0056664 A1* | 2/2016 | Partovi | H02J 50/80 307/104 |
| 2016/0141097 A1* | 5/2016 | Oo | H01F 5/003 320/108 |
| 2016/0141899 A1* | 5/2016 | Oo | H02J 7/0044 320/108 |
| 2016/0163451 A1* | 6/2016 | Wang | H01F 27/2804 336/200 |
| 2016/0172890 A1* | 6/2016 | Jeong | H02J 50/12 320/108 |
| 2016/0197511 A1* | 7/2016 | Atasoy | H02J 50/10 307/104 |
| 2016/0254701 A1 | 9/2016 | Tsuda et al. | |
| 2017/0164483 A1* | 6/2017 | Kouchi | H01F 38/14 |
| 2017/0179773 A1* | 6/2017 | Kim | H02J 50/402 |
| 2017/0288459 A1* | 10/2017 | Georgakopoulos | H01F 38/14 |
| 2018/0102213 A1* | 4/2018 | Hanabusa | H01F 27/2804 |
| 2018/0248411 A1 | 8/2018 | Sagi et al. | |
| 2019/0334391 A1* | 10/2019 | Qi | H01F 38/14 |
| 2020/0328613 A1* | 10/2020 | Reinger | H01M 10/44 |

FOREIGN PATENT DOCUMENTS

| | | |
|---|---|---|
| KR | 10-2015-0005479 A | 1/2015 |
| KR | 10-2016-0016551 A | 2/2016 |
| KR | 10-2016-0068925 A | 6/2016 |
| KR | 10-2016-0086685 A | 7/2016 |
| KR | 10-2018-0044369 A | 5/2018 |

* cited by examiner

CIRCUMFERENCE 30mm

GAP

<CROSS SECTION OF COIL>

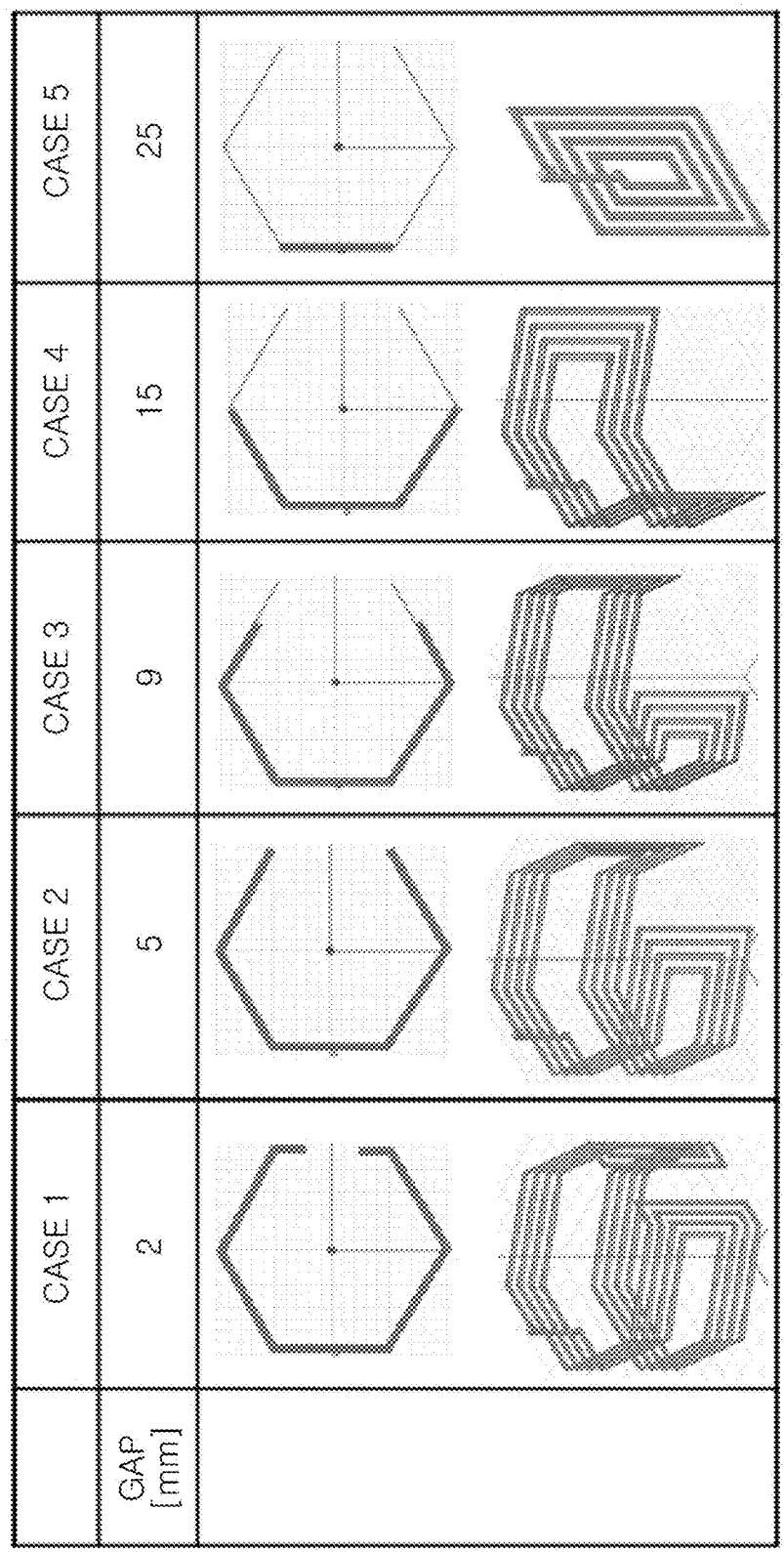

| | [mm] |
|---|---|
| r1/z1 | 34.625 / 11 |
| r2/z2 | 32.765 / 7.4 |
| r3/z3 | 30.655 / 5.1 |
| r4/z4 | 28.205 / 3.25 |
| r5/z5 | 25.455 / 1.6 |
| r6/z6 | 22.325 / 0 |

SERIAL CONNECTION

PARALLEL CONNECTION

THREE-DIMENSIONAL WIRELESS POWER TRANSFER COIL AND APPARATUS HAVING SAME

CROSS-REFERENCE TO RELATED APPLICATIONS

This application is a continuation of pending PCT International Application No. PCT/KR2020/016998, filed on Nov. 26, 2020, which claims priority to Korean Patent Application No. 10-2019-0153564 filed in the Korean Intellectual Property Office on Nov. 26, 2019, the entire contents of which are incorporated herein by reference.

TECHNICAL FIELD

The disclosure relates to a wireless power transfer (WPT) coil and an apparatus including the same and, more particularly, to a WPT coil configured to have a three-dimensional shape by using a flexible substrate or the like, and an apparatus including the same.

BACKGROUND ART

There has recently been continuous expansion of the range of usage of WPT technology which uses magnetic coupling at a short distance.

The WPT technology using magnetic coupling uses induction of a voltage in a secondary coil positioned within a time-variable magnetic field generated by a primary coil.

In this connection, WPC (Wireless Power Consortium) has used wireless induction technology to authenticate and sell magnetically-coupled WPT products for smartphones, smartwatches, and the like.

In addition, AirFuel Alliance has been making efforts to establish international standards regarding WPT products to which magnetic resonance technology is applied, and to stimulate to the market.

Currently commercialized magnetically-coupled power transmission products commonly coils implemented in flat plate shapes. When implemented on a printed circuit board, a litz wire or the like is used to fabricate one in a flat structure.

Meanwhile, there has recently been increasing use of earbud-type wireless earphones using Bluetooth, open-type earphones, or kernel-type earphones. Furthermore, in line with recently increasing demands for hearing aids for hearing-impaired people, there have been rapidly increasing demands for rechargeable secondary batteries rather than small primary batteries due to convenience, especially for elderly people.

As such, low-power short-distance wireless communication technology has already been applied to mobile products and widely used, and has recently been combined with small wearable device products (for example, wireless sound devices), thereby exponentially expanding the market for wireless sound devices (for example, Bluetooth wireless earphones).

In addition, low-power short-distance wireless communication technology has been combined with existing wearable medical devices (for example, hearing aids) such that communication is possible directly through a hearing aid from a terminal (for example, smartphone), music can be heard therethrough, and a hearing aid function is provided for hearing-impaired people. In this connection, wireless wearable health care device products are commercially available, each product providing various functions.

Meanwhile, a conventional wireless earphone product commonly includes a wireless earphone and a case (cradle) for storing the same. The case has an embedded rechargeable battery having a designated capacity, and the small wireless earphone also has an embedded small secondary battery. Accordingly, the wireless earphone is charged in a contact type such that an electrode exposed to a part of the wireless earphone contacts an electrode of the case, thereby charging the same.

In this connection, WPC Qi technology which is an internal wireless charging standard based on magnetic induction has recently been applied to products such that case batteries are wireless charged, and wireless charging technology is also applied to hearing aid products. For example, some companies produce hearing aid products using a wireless charging platform employing silver-zinc batteries (FIG. 1A). Alternatively, a structure is used in which a coil is wound around a Li-ion battery and a case (FIG. 1B).

Meanwhile, wireless hearable devices such as wireless earbuds, hearing aids, and personal sound amplifier (PASP) do not use typical rectangular parallelepiped batteries, due to structural characteristics, but rather use atypically structured batteries which are similar to cylindrical shapes appropriate for the structure, or which is more appropriate for the structure than existing typical commercial batteries in order to maximize the empty space in the structure to be used. This is epitomized by cylindrical batteries used for famous wireless earphone products from company A.

Accordingly, conventional flat plate-type or typical structures used for coils for transmitting or receiving power in connection with wireless charging cannot utilize the available space of products to the maximum, and this places restrictions on securing the battery capacity.

DISCLOSURE OF INVENTION

Technical Problem

The disclosure has been made to solve the above-mentioned problems occurring in the prior art, and it is an aspect of the disclosure to provide a WPT coil and an apparatus including the same, wherein the coil has a three-dimensional shape according to the structure of a product to which the same is applied such that the available space is utilized to the maximum, thereby improving the WPT efficiency, and expanding the battery capacity.

Other detailed aspects of the disclosure will be clearly apprehended and understood by experts or researchers in the pertinent technical field from the following detailed description.

Solution to Problem

A WPT coil according to an embodiment of the disclosure is a WPT coil provided in a WPT device for transmitting or receiving wireless power, the WPT coil including: a flexible substrate such as a flexible printed circuit board; and a coil structure provided on the flexible substrate, wherein the WPT coil has a three-dimensional shape rather than a flat plate shape.

The coil structure may be configured to be provided on both upper and lower surfaces of the flexible substrate, and may be configured such that current directions of the upper and lower surfaces are the same.

The coil structure may be configured such that patterns of the coil structure overlap each other on the upper and lower surfaces of the flexible substrate.

In addition, the coil structure may be configured such that some or all of the patterns of the coil structure are dislocated from each other on the upper and lower surfaces of the flexible substrate.

In addition, the coil structure may have a structure in which two or more metal patterns are separated and disposed in parallel at predetermined intervals.

In addition, the coil structure may have a structure wound around a circular structure.

In addition, the coil structure may have a structure wound around a rectangular structure with the opposite sides of the same length.

In addition, the WPT coil may have a three-dimensional shape with a curved cross section forming an arc shape, or a bent cross section forming a polygonal shape.

In addition, the WPT coil may be implemented according to the shape of a coil structure around which a coil is wound.

The WPT coil may have a structure in which the length of the cross section of the arc or polygon shape is half of the circumference length of the entire circle or the entire polygon.

The WPT coil may surround the entire circle or the entire polygon using a plurality of sub-coils including a first coil and a second coil.

Alternatively, the WPT coil may include a first coil and a second coil which are asymmetric with each other, and which surrounds the entire circle or the entire polygon.

In addition, the first coil and the second coil may be connected in series with each other.

In addition, wherein the first coil is provided on upper surface, the second coil is provided on lower surface, the first coil and the second coil are aligned and connected to each other, and the first coil and the second coil have the same current direction.

In addition, the first coil and the second coil may be connected in parallel to each other.

In addition, the WPT coil may have a three-dimensional shape formed by winding the cross section into a circular or polygonal shape.

In addition, a WPT coil according to another embodiment of the disclosure is a WPT coil provided in a WPT device for transmitting or receiving wireless power, the WPT coil including: a coil structure provided on a substrate forming a three-dimensional shape; wherein the coil structure is configured to be provided on both upper and lower surfaces of the substrate, and is configured such that current directions of the upper and lower surfaces are the same.

In addition, a WPT device according to another embodiment of the disclosure is a WPT device including a WPT coil transmitting or receiving wireless power, the WPT coil including: a flexible substrate such as a flexible printed circuit board; and a coil structure provided on the flexible substrate, wherein the WPT coil has a three-dimensional shape rather than a flat plate shape.

The WPT coil may be mounted outside a structure including a metal material.

A shielding material positioned between the structure and the WPT coil may be provided.

In addition, the WPT coil may include a first coil and a second coil that form a symmetrical structure and surround the structure.

In addition, the WPT coil including the first coil and the second coil is bent and the cross section become a polygonal shape.

Advantageous Effects of Invention

A WPT coil and an apparatus including the same, according to an embodiment of the disclosure, configure a WPT coil having a three-dimensional shape by using a flexible substrate or the like such that the available space of a product to which the WPT coil is applied can be utilized to the maximum, the WPT efficiency can be improved, and the battery capacity can be expanded.

Accordingly, a WPT coil and an apparatus including the same, according to an embodiment of the disclosure, are appropriate for a structure having a curved surface or the like and thus can be easily applied to various atypical types of products.

In addition, a WPT coil and an apparatus including the same, according to an embodiment of the disclosure, use a coil having a three-dimensional shape (for example, curved coil) appropriate for a structure such that a limited space of a small device can be used optimally, and compactness is also possible.

In addition, a WPT coil and an apparatus including the same, according to an embodiment of the disclosure, use a coil having a three-dimensional shape (for example, curved coil) such that mutual inductance and resistance can be adjusted while reducing the used space, thereby improving the efficiency.

In addition, a WPT coil and an apparatus including the same, according to an embodiment of the disclosure, use a dual-configured coil such that inductance and mutual inductance can be increased, and the efficiency can be improved.

In addition, a WPT coil and an apparatus including the same, according to an embodiment of the disclosure, use two coils disposed on two surfaces, even when a metal is placed at the center, such that power can be efficiently received. When a metal is placed in the center (eg, a cylindrical battery), an area in which a magnetic field can be received and an area in which a magnetic field cannot be received are generated depending on the arrangement of the transmitting and receiving coils. In this case, by arranging the two coils on both sides, power can be efficiently received in both directions without a region where the magnetic field is blocked by the central metal.

BRIEF DESCRIPTION OF DRAWINGS

The attached drawings included as part of the detailed description for better understanding of the disclosure provide embodiments of the disclosure, and explain the technical ideas of the disclosure with the detailed description.

FIGS. 3, 4A to 4C, 5, and 6A to 6D are diagrams illustrating various embodiments of WPT coils according to an embodiment of the disclosure.

BEST MODE FOR CARRYING OUT THE INVENTION

The disclosure may apply various transformations and may have various embodiments. Hereinafter, specific embodiments will be described in detail based on the accompanying drawings.

The following embodiments are provided to provide a comprehensive understanding of the methods, apparatus, and/or systems described herein. However, this is merely an example, and the disclosure is not limited thereto.

In describing the embodiments of the disclosure, if it is determined that a detailed description of a known technology related to the disclosure may unnecessarily obscure the gist of the disclosure, the detailed description thereof will be omitted. In addition, the terms to be described later are terms defined in consideration of functions in the disclosure, which may vary according to intentions or customs of users and operators. Therefore, the definition should be made based on the content throughout the disclosure. The terminology used in the detailed description is for the purpose of describing the embodiments of the disclosure only, and should not be limiting in any way. Unless explicitly used otherwise, expressions in the singular include the meaning of the plural. In this description, expressions such as "including" or "having" are intended to indicate certain characteristics, numbers, steps, operations, elements, and some or a combination thereof, and should not be construed to exclude the presence or possibility of one or more other characteristics, elements, and some or combinations thereof other than those described.

In addition, terms such as first, second, etc. may be used to describe various components, but the components are not limited thereto, and the terms are used only to distinguish one element from another element.

Hereinafter, exemplary embodiments of a WPT coil according to an embodiment of the disclosure will be described with reference to the accompanying drawings.

Figure 1A:
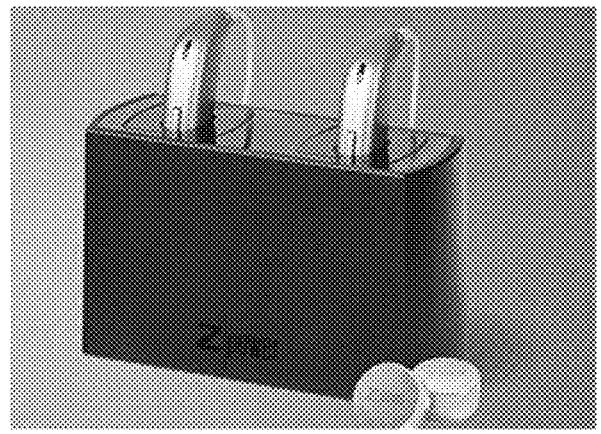
FIGS. 1A and 1B are diagrams illustrating small wireless charging apparatuses according to the prior art.
Figure 1B:
Figure 2A:
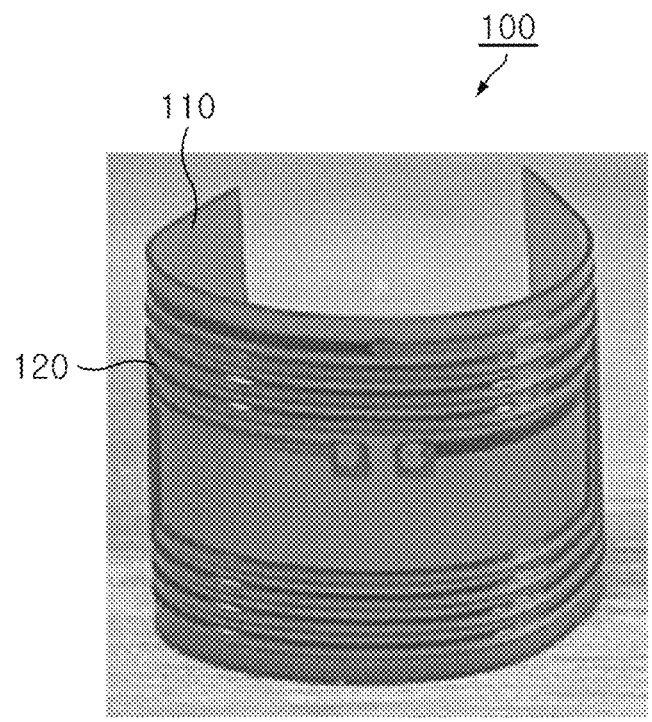
FIGS. 2A to 2C are diagrams illustrating WPT coils according to an embodiment of the disclosure.

First, FIG. 2A illustrates a WPT coil 100 according to an embodiment of the disclosure.

As illustrated in FIG. 2A, the WPT coil 100 according to an embodiment of the disclosure is a WPT coil 100 provided in the WPT device to transmit or receive wireless power, and the WPT coil 100 includes a flexible substrate 110 and a coil structure 120 provided in the flexible substrate 110, and has a three-dimensional shape rather than a flat plate shape.

In this case, in the WPT coil 100 according to an embodiment of the disclosure, the flexible substrate 110 may be manufactured using a flexible printed circuit board (FPCB), but the disclosure is not limited thereto and may be implemented as various substrates having flexibility.

In addition, the WPT coil 100 having a three-dimensional shape includes a case in which the flexible substrate 110 of a flat shape (2D) is curved or bent to have a three-dimensional (3D) shape, but the disclosure is not limited thereto, and it may be possible to implement the WPT coil 100 in various shapes.

In addition, the coil structure 120 provided in the flexible substrate 110 may be implemented using a general metal conducting wire.

FIG. 2A illustrates a curved WPT coil 100 manufactured using a flexible substrate.

Figure 2B:
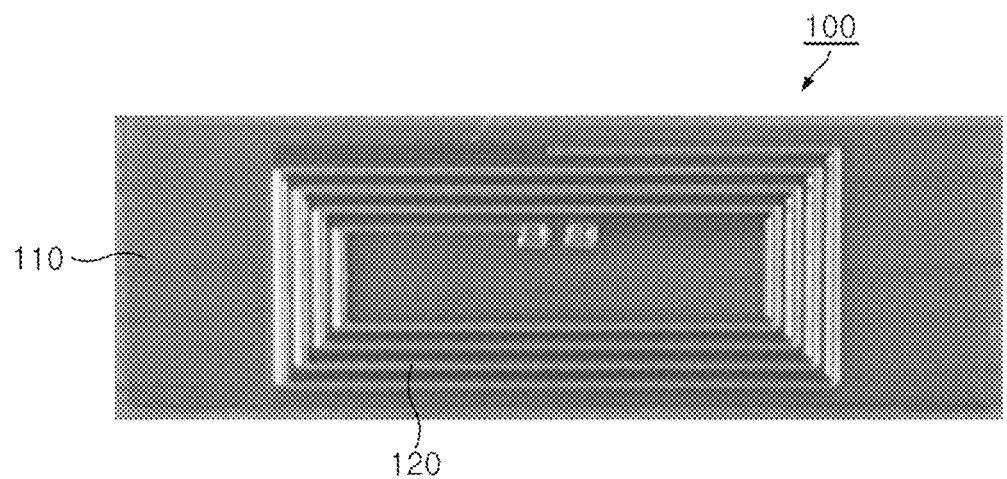

In addition, FIG. 2B illustrates a WPT coil 100 in a flat plate shape before converting into a curved shape.

Figure 2C:
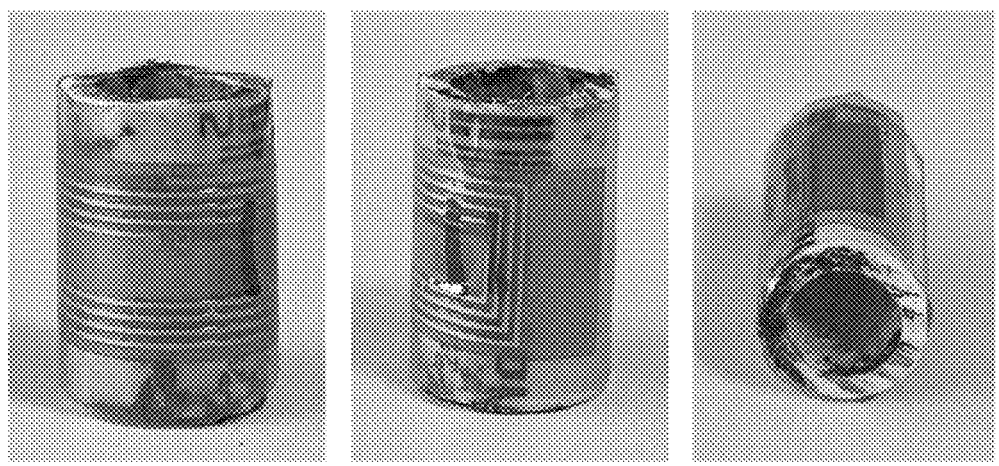

Furthermore, FIG. 2C illustrates a shape of a curved WPT coil 100 mounted on a cylindrical coil structure.

In this case, as illustrated in FIG. 2C, the curved WPT coil 100 may not be wound around the entire cylindrical structure, but may be partially wound around a portion of the cylindrical structure.

In this case, in the WPT coil 100, two or more metal patterns of the coil structure 120 may be separated and used. In this case, the separated metal patterns may be implemented in a structure disposed parallel to each other. In addition, it is possible to manufacture using a metal wire. In this case, even in the case of a metal wire, a plurality of wires may be arranged in parallel.

In addition, in the WPT coil 100 according to an embodiment of the disclosure, the coil structure 120 may be provided on both an upper surface and a lower surface of the flexible substrate 110.

Figure 3:
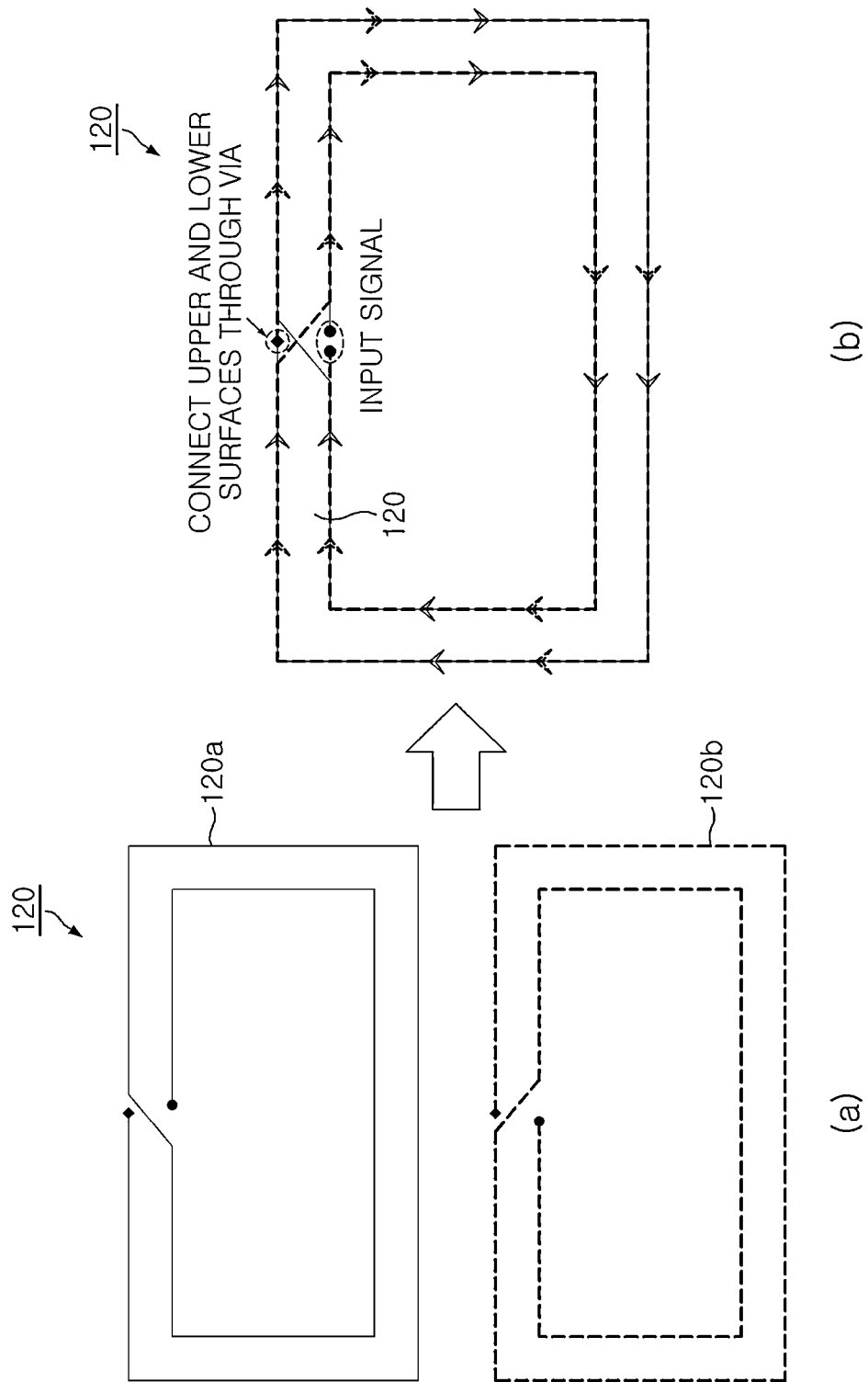

That is, the coil structure 120 may be manufactured to be provided on both surfaces of the flexible substrate 110, and FIG. 3 illustrates an example of the coil structure 120 manufactured on both surfaces.

More specifically, as illustrated in FIG. 3, the coil structure pattern 120a provided on the upper surface and the coil structure pattern 120b provided on the lower surface may be connected to each other using a via or the like.

In this case, as illustrated in FIG. 3(b), by configuring the upper surface and the lower surface to have the same current direction, inductance of the WPT coil 100 may be increased, and mutual inductance may also be increased to improve WPT efficiency. FIG. 3 shows the configuration in which the upper surface and the lower surface are connected in series. That is, the same current flows to all patterns on each surface.

In this case, in the WPT coil 100, two or more metal patterns of the coil structure 120 may be separated and used. In this case, the separated metal patterns may be implemented in a structure disposed parallel to each other. The configuration in which the metal patterns composed of multiple layers are composed in parallel is not shown in the figure. In addition, it is possible to manufacture using a metal wire. In this case, even in the case of a metal wire, a plurality of wires may be arranged in parallel. More specifically, parallel configuration refers to a configuration in which two or more patterns or wires are bundled. In series configuration, the same current flows to each pattern or wire, in parallel configuration, the same current is applied to the patterns or wires in which input parts are bundled together, and the current flows differently depending on the impedance of the pattern.

In addition, as illustrated in FIG. 3(b), patterns of the coil structures 120 may be configured to overlap each other on the upper and lower surfaces of the flexible substrate 110. However, the disclosure is not necessarily limited thereto, and conversely, in order to improve inductance and resistance characteristics, some or all of the patterns of the coil structures 120 may be configured not to overlap each other on the upper and lower surfaces of the flexible circuit board 110.

In addition, the structure in which the coil structure 120 is wound may be a circle structure in the case of a circular shape, and in the case of a rectangle, it may be implemented as a structure in which opposite sides have the same length. Accordingly, a larger power may be received as compared with a circular or rectangular spiral structure, which may be a more suitable method because it is advantageous to increase a magnetic field reception area in a small hearing aid or the like. Furthermore, when applied to the transmission unit, a larger magnetic field may be formed, and the magnetic field may be formed symmetrically.

In addition, the WPT coil 100 according to an embodiment of the disclosure may have a three-dimensional shape with a curved cross section forming an arc shape, or a bent cross section forming a polygonal shape.

Accordingly, the WPT coil 100 may be implemented in a three-dimensional shape while being wound to have a circular or polygonal cross-section.

In this case, the WPT coil 100 may not exceed half of the circumference of the entire circle or the entire polygon.

Furthermore, in the WPT coil 100 according to an embodiment of the disclosure, in order to obtain the maximum mutual inductance, it is preferable that the length of the cross section of the arc or polygon shape of the WPT coil 100 is half of the circumference length of the entire circle or the entire polygon.

Figure 4A:
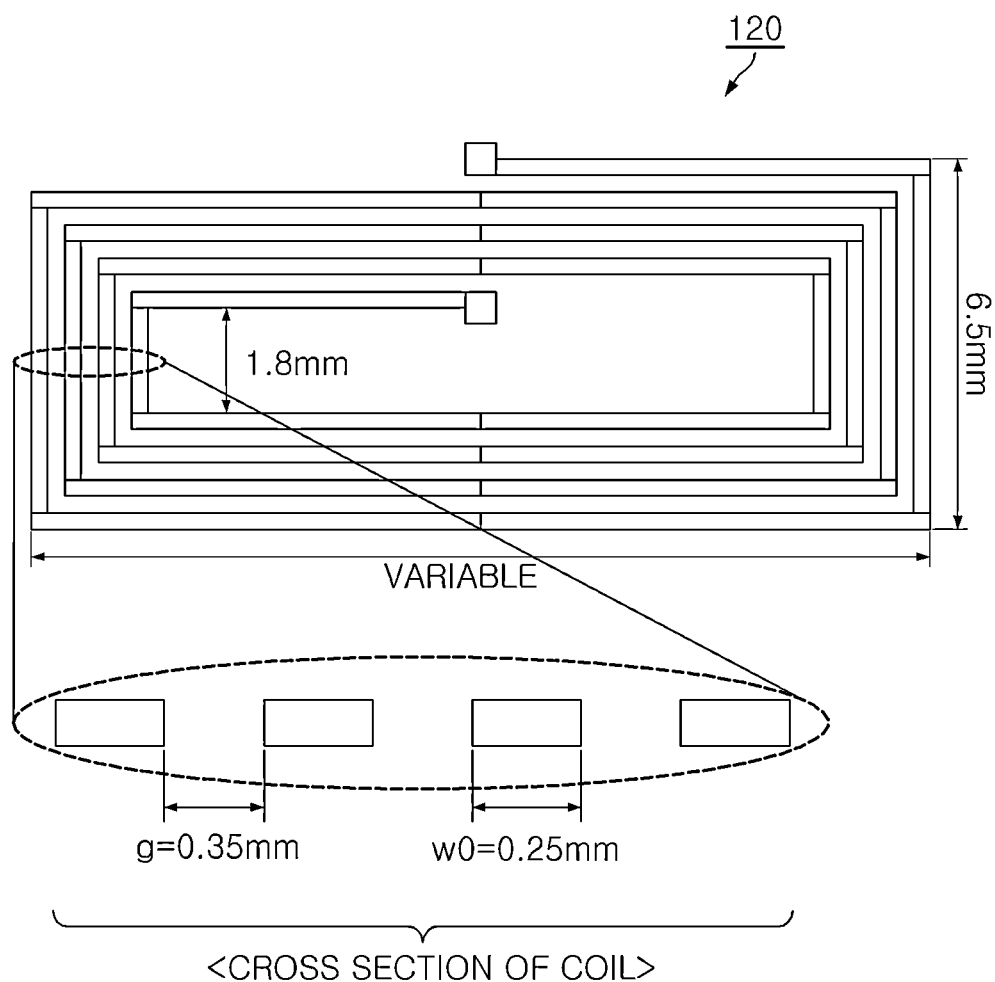

In addition, FIG. 4A illustrates a coil structure 120 spread out in a flat plate shape as in FIG. 2B. As illustrated in FIG. 4A, the illustrated coil structure 120 exemplifies a case in which the number of rotations is 4 turns, the width of the outermost pattern has a variable length, the height is 6.5 mm, and the height of the innermost rectangular loop is 1.8 mm.

Figure 4B:
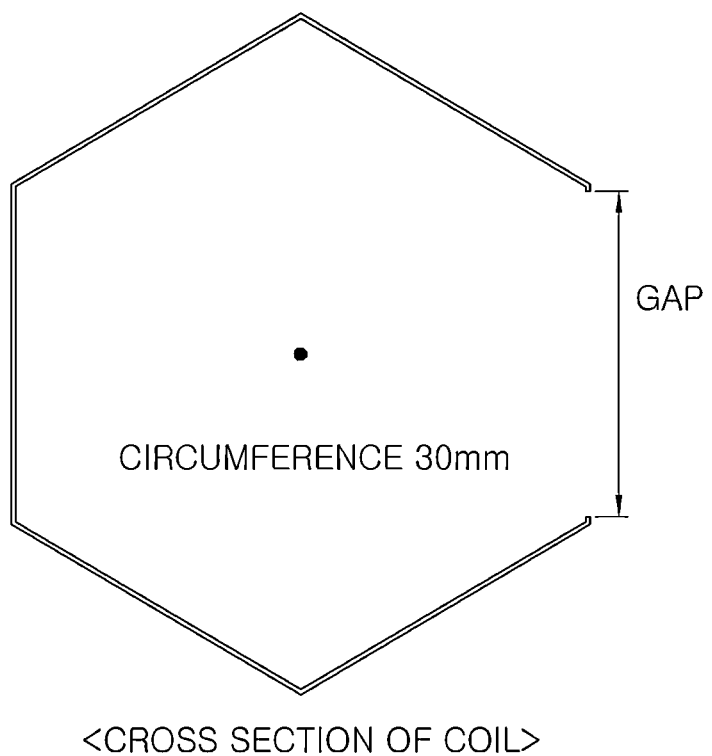

In addition, FIG. 4B illustrates a cross section in which the coil structure 120 of FIG. 4A is wound around a regular hexagonal structure. In this case, when the length of one side of the hexagon in FIG. 4B is 5 mm, the total circumference is 30 mm.

Here, the regular hexagon is one of the embodiments, and the disclosure is not limited thereto, and may be implemented in various shapes such as a circle and a rectangle.

In addition, the length of the gap in which the coil structure 120 is not wound and empty may be changed according to the length of the outermost pattern of the coil structure 120.

In this case, in the WPT coil 100 according to an embodiment of the disclosure, it is preferable that the length (that is, the length at which the coil structure 120 is wound around a regular hexagon) of the outermost pattern of the coil structure 120 is less than half of the total circumference of the regular hexagon.

In addition, when the WPT coil 100 has a circular shape, it is preferable that the length of the outermost pattern does not exceed half of the total circumference of the circle.

In addition, FIG. 4C illustrates various cross-sectional structures of the coil structure 120 according to various gaps in the WPT coil 100 according to an embodiment of the disclosure.

As illustrated in FIG. 4C, the degree of surrounding the regular hexagon varies according to the gap, and in particular, when the coil structure 120 has a half shape of the regular hexagon, as illustrated in case 4, WPT efficiency may be maximized.

Figure 5:
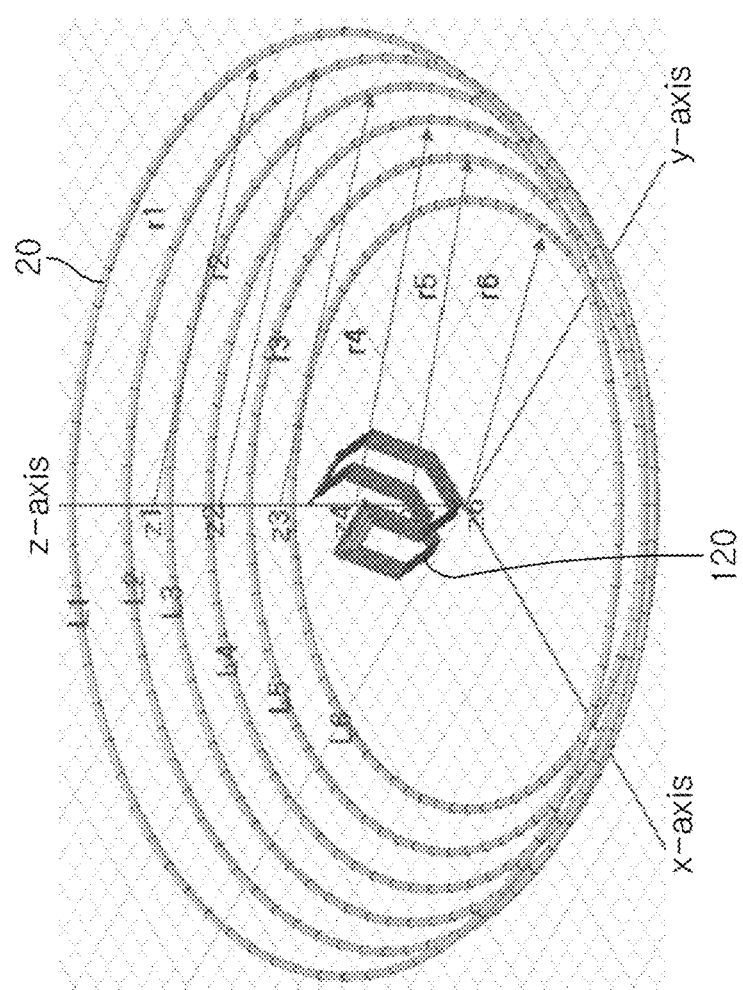

More specifically, in FIG. 5, for various cases illustrated in FIG. 4C, when wireless power is received from the WPT device 20 having a bowl-shaped transmission coil, a model for simulating the maximum coupling efficiency (η) between transmitting and receiving coils for each case is illustrated, and in the disclosure, the Maxwell program which is a commercial tool was used for simulation.

In addition, in FIG. 5, in order to reduce the analysis time for the transmitting coil of the WPT device 20, a model equivalent to six turns of coils was used, and 0.4277Ω was obtained as an AC resistance of the transmitting unit through simulation.

Table 1 below shows the results obtained through simulation of the structure of FIG. 4C using the model illustrated in FIG. 5.

In this case, the following Equation 1 was used to calculate the maximum transmission efficiency (η) between the transmitting and receiving coils. Here, the Figure of Merit (FoM) is a performance index of a WPT/reception system, which may be determined by a resistance of a transmission coil (R1=0.4277Ω), a resistance of a reception coil (R2), a mutual inductance (M), and a usage frequency (f).

$$\eta = \left( \frac{\sqrt{(1+FoM^2)}-1}{\sqrt{(1+FoM^2)}+1} \right), FoM = \frac{2\pi fM}{\sqrt{R1R2}}$$ [Equation 1]

TABLE 1

|  | Case 1 | Case 2 | Case 3 | Case 4 | Case 5 |
| --- | --- | --- | --- | --- | --- |
| gap [mm] | 2 | 5 | 9 | 15 | 25 |
| L [nH] | 325.40 | 299.59 | 252.66 | 187.31 | 62.070 |
| R [mohm] | 373.77 | 341.48 | 286.99 | 212.51 | 94.256 |
| M [nH] | 7.8512 | 12.057 | 16.419 | 19.648 | 7.2998 |
| FoM | 0.84 | 1.34 | 2.00 | 2.78 | 1.55 |
| eff [%] | 13.18 | 25.24 | 38.14 | 49.38 | 29.67 |

In addition, in Table 1, L, R, and M refer to self-inductance, resistance, and mutual inductance of the coil structure 120 in each case.

In this case, as illustrated in Table 1, it may be confirmed that the efficiency of Case 4 is the highest.

That is, it may be seen that the highest efficiency is obtained when the length of the cross section of the arc or polygonal shape of the WPT coil 100 is half the circumference of the entire circle or the entire polygon.

In addition, as illustrated in FIG. 5, it is preferable that the length of the cross-section of the arc or polygonal shape of the WPT coil 100 of the WPT device 20 for receiving wireless power in a transmitting coil having a plurality of parallel coils surrounds half of the circumference of the entire circle or the entire polygon.

Furthermore, as illustrated in FIG. 5, when the WPT coil 100 is placed at the center of the bottom surface of the bowl, it is preferable that the WPT coil 100 is disposed to be symmetrical with respect to a predetermined plane (e.g., the YZ plane) perpendicular to the bottom surface.

However, this is only an embodiment of the disclosure, and the WPT coil 100 according to the disclosure may transmit and receive wireless power in response to a flat spiral-shaped coil in addition to the bowl-shaped coil. In addition, as an embodiment of the disclosure, the WPT coil 100 provided in the WPT device 20 to transmit or receive wireless power includes a coil structure 120 provided on a three-dimensional substrate, and may be provided on both an upper surface and a lower surface of the substrate, and may be configured such that the current directions of the upper and lower surfaces are the same.

Mode for Carrying Out the Invention

In addition, in the WPT coil 100 according to an embodiment of the disclosure, the WPT coil 100 may have a structure surrounding the entire circle or the entire polygon by using a plurality of sub-coils including the first coil and the second coil.

More specifically, in the disclosure, when a structure 11 including a metal material such as a battery is located at the center of a WPT device 10 such as a wireless earphone or a hearing aid, the WPT coil 100 may be divided into two.

Figure 6A:
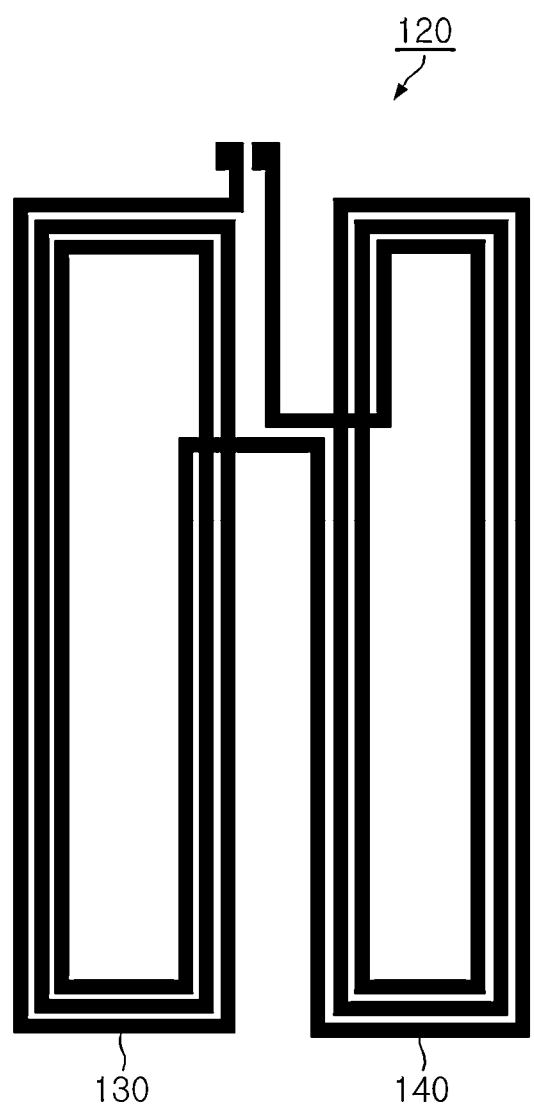

For example, FIG. 6A illustrates a structure in which the first coil 130 and the second coil 140 are connected in series and unfolded. In the case of series connection, the same current flows in all conductors.

Figure 6B:
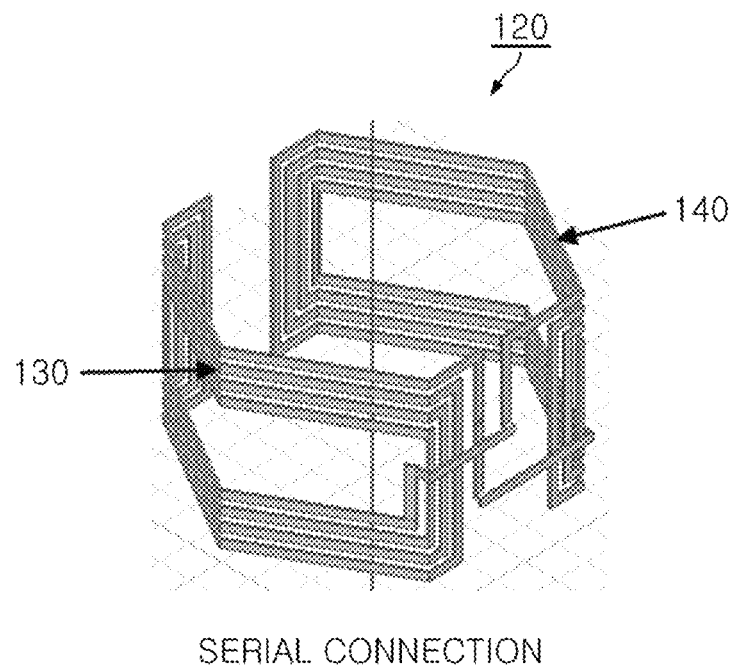
Figure 6C:
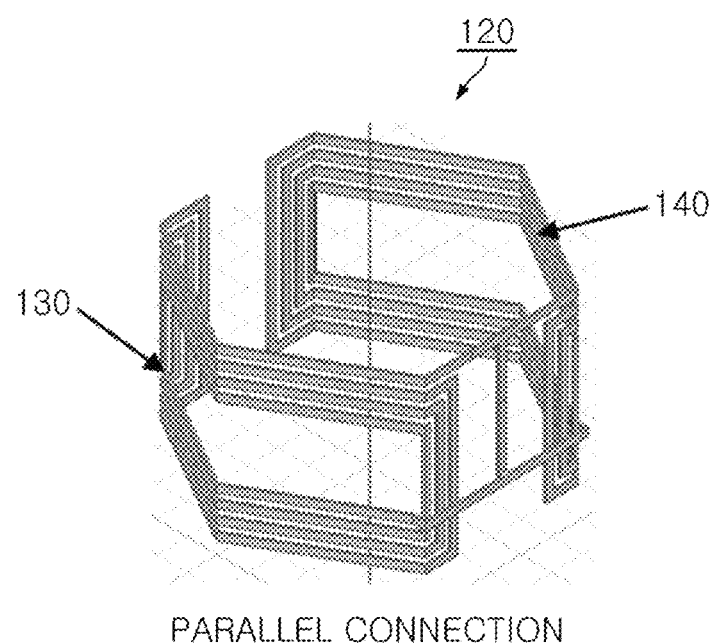

In addition, if the first coil 130 and the second coil 140 are bent and the cross section become a polygonal shape, it may be implemented in the shape illustrated in FIGS. 6B and 6C.

In this case, FIG. 6B illustrates a structure in which the first coil 130 and the second coil 140 are connected in series, and FIG. 6C illustrates a structure in which the first coil 130 and the second coil 140 are connected in parallel. In the case of parallel connection, two metal patterns are grouped, and the sum of the currents applied to the two patterns is constant.

Here, when the two coils are connected in parallel as described above, resistance may be lowered, and when the two coils are connected in series, mutual inductance may be increased.

Furthermore, the structure in which the two coils are symmetrical to each other as described above has an advantage of efficiently receiving power in both left and right directions around the structure 11 including a metal material even when the structure 11 having a round or polygonal shape is present at the center.

Figure 6D:
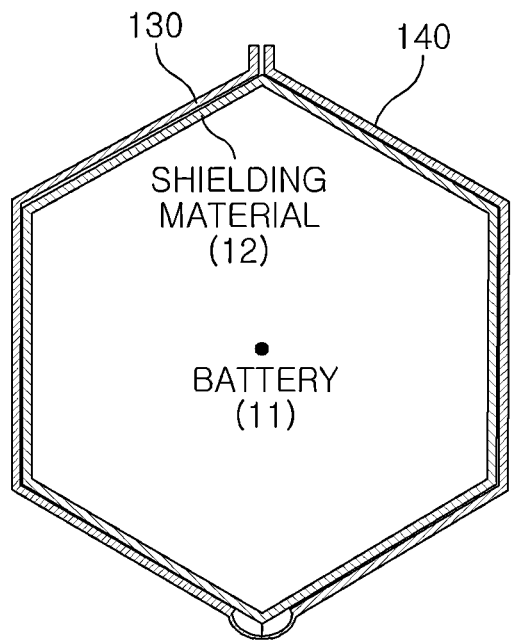

In addition, FIG. 6D illustrates an arrangement structure in which the first coil 130 and the second coil 140 are symmetrically surrounded with respect to a case where a structure 11 including a metal material such as a battery is located at the center.

In this case, in FIG. 6D, the first coil 130 and the second coil 140 may be connected in series or in parallel, and a shielding material 12 may be used between the structure 11 and the WPT coil 100 to solve an inductance reduction caused by a metal eddy current.

Figure 7A:
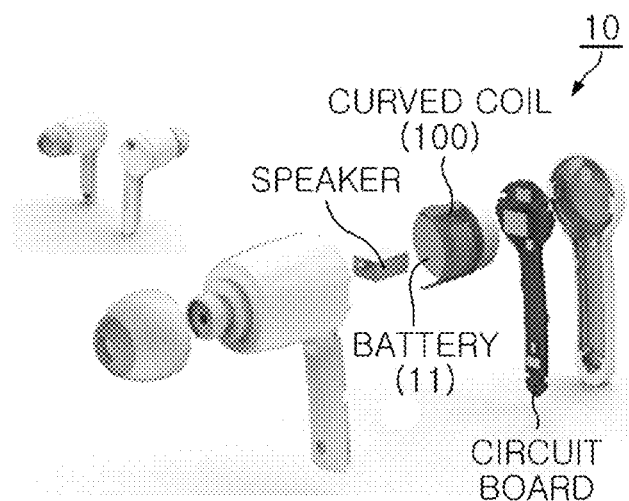
FIGS. 7A and 7B are diagrams illustrating a hearing aid to which a WPT coil is applied according to an embodiment of the disclosure.
Figure 7B:
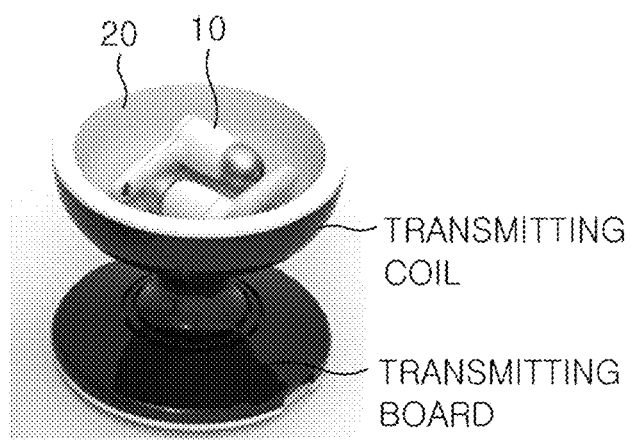

In addition, FIGS. 7A and 7B illustrate a hearing aid (i.e., a WPT device 10) to which the WPT coil 100 according to an embodiment of the disclosure is applied.

First, as illustrated in FIG. 7A, the curved WPT coil 100 is manufactured to be suitable for the round body of the hearing aid, and in particular, to surround only about half of the round-shaped battery (i.e., structure 11).

In addition, FIG. 7B illustrates a state in which the hearing aid (that is, the WPT device 10) is embedded and charged in the ball-type WPT device 20.

Accordingly, in the WPT coil 100 and the WPT device 10 having the same according to an embodiment of the disclosure, a three-dimensional shape such as a curved shape may be formed depending on the structure of the product to be applied to improve WPT efficiency by utilizing the most of available space and further expand battery capacity.

The above description is merely illustrative of the technical spirit of the disclosure, and various modifications and variations will be possible without departing from the essential characteristics of the disclosure by those skilled in the art to which the disclosure pertains. Accordingly, the embodiments described in the disclosure are not intended to limit the technical spirit of the disclosure, but to explain, and are not limited to these embodiments. The protection scope of the disclosure should be construed by the following claims, and all technical ideas within the scope equivalent thereto should be construed as being included in the scope of the disclosure.

The invention claimed is:

1. A wireless power transfer (WPT) coil provided in a WPT device for transmitting or receiving wireless power, the WPT coil comprising:
   a flexible substrate; and
   a coil structure provided on the flexible substrate,
   wherein the WPT coil has a three-dimensional shape rather than a flat plate shape,
   wherein the coil structure is configured to be provided on both upper and lower surfaces of the flexible substrate, and is configured such that current directions of the upper and lower surfaces are the same,
   wherein the WPT coil has a three-dimensional shape with a curved cross section forming an arc shape, or a bent cross section forming a polygonal shape,
   wherein the WPT coil has a structure in which the length of the cross section of the arc or polygon shape is half of the circumference length of the entire arc or the entire polygon to obtain the maximum mutual inductance,
   wherein the WPT coil surrounds the entire arc or the entire polygon using a plurality of sub-coils including a first coil and a second coil.

2. The WPT of claim 1, wherein the first coil and the second coil are connected in series with each other.

3. The WPT of claim 2, wherein the first coil is provided on upper surface, the second coil is provided on lower surface, the first coil and the second coil are aligned and connected to each other, and the first coil and the second coil have the same current direction.

4. The WPT of claim 1, wherein the first coil and the second coil are connected in parallel to each other.

5. A WPT device including a WPT coil transmitting or receiving wireless power, the WPT coil comprising:
   a flexible substrate; and
   a coil structure provided on the flexible substrate,
   wherein the WPT coil has a three-dimensional shape rather than a flat plate shape,
   wherein the coil structure is configured to be provided on both upper and lower surfaces of the flexible substrate, and is configured such that current directions of the upper and lower surfaces are the same,
   wherein the WPT coil has a three-dimensional shape with a curved cross section forming an arc shape, or a bent cross section forming a polygonal shape,
   wherein the WPT coil has a structure in which the length of the cross section of the arc or polygon shape is half of the circumference length of the entire arc or the entire polygon to obtain the maximum mutual inductance,
   wherein the WPT coil is mounted outside a structure including a metal material,
   wherein a shielding material positioned between the structure and the WPT coil is provided.

6. A WPT device including a WPT coil transmitting or receiving wireless power, the WPT coil comprising:
   a flexible substrate; and
   a coil structure provided on the flexible substrate,
   wherein the WPT coil has a three-dimensional shape rather than a flat plate shape,
   wherein the coil structure is configured to be provided on both upper and lower surfaces of the flexible substrate, and is configured such that current directions of the upper and lower surfaces are the same,
   wherein the WPT coil has a three-dimensional shape with a curved cross section forming an arc shape, or a bent cross section forming a polygonal shape,
   wherein the WPT coil has a structure in which the length of the cross section of the arc or polygon shape is half of the circumference length of the entire arc or the entire polygon to obtain the maximum mutual inductance,
   wherein the WPT coil is mounted outside a structure including a metal material,
   wherein the WPT coil includes a first coil and a second coil that form a symmetrical structure and surround the structure.

7. The WPT of claim 6, wherein the WPT coil including the first coil and the second coil is bent and the cross section becomes a polygonal shape.

\* \* \* \* \*